US006996574B2

(12) United States Patent
Gluckman

(10) Patent No.: US 6,996,574 B2
(45) Date of Patent: Feb. 7, 2006

(54) SYSTEM AND METHOD FOR ACCESSING DATABASE DESIGN INFORMATION

(75) Inventor: Howard Gluckman, Longmont, CO (US)

(73) Assignee: CSG Systems, Inc., Englewood, CO (US)

( * ) Notice: Subject to any disclaimer, the term of this patent is extended or adjusted under 35 U.S.C. 154(b) by 433 days.

(21) Appl. No.: 10/123,707

(22) Filed: Apr. 16, 2002

(65) Prior Publication Data

US 2002/0161744 A1 Oct. 31, 2002

Related U.S. Application Data

(60) Provisional application No. 60/284,503, filed on Apr. 18, 2001.

(51) Int. Cl.
G06F 17/30 (2006.01)
(52) U.S. Cl. .................. 707/102; 707/10; 717/104; 709/203; 709/219
(58) Field of Classification Search ............. 707/3–5, 707/9, 10, 101, 102, 104.1, 201; 709/203, 709/219; 717/104
See application file for complete search history.

(56) References Cited

U.S. PATENT DOCUMENTS

| 5,325,465 | A |   | 6/1994  | Hung et al. |         |
|-----------|---|---|---------|-------------|---------|
| 5,592,668 | A |   | 1/1997  | Harding et al. |      |
| 5,724,556 | A | * | 3/1998  | Souder et al. ................. | 703/2 |
| 5,802,514 | A | * | 9/1998  | Huber ........................... | 707/4 |
| 5,842,212 | A | * | 11/1998 | Ballurio et al. ............. | 707/100 |
| 5,966,707 | A | * | 10/1999 | Van Huben et al. .......... | 707/10 |
| 6,128,624 | A |   | 10/2000 | Papierniak et al. |       |
| 6,167,406 | A | * | 12/2000 | Hoskins et al. ............. | 707/102 |
| 6,349,404 | B1 | * | 2/2002  | Moore et al. ................ | 717/104 |
| 6,381,743 | B1 | * | 4/2002  | Mutschler, III ............. | 717/104 |
| 6,604,068 | B1 | * | 8/2003  | Bukowski et al. ............ | 703/22 |
| 6,611,838 | B1 | * | 8/2003  | Ignat et al. ................. | 707/101 |
| 6,662,188 | B1 | * | 12/2003 | Rasmussen et al. ......... | 707/102 |
| 2002/0082818 | A1 | * | 6/2002 | Ferguson et al. ............. | 703/22 |
| 2003/0065663 | A1 | * | 4/2003 | Chu ........................... | 707/10 |
| 2003/0225920 | A1 | * | 12/2003 | Bussler et al. .............. | 709/310 |
| 2003/0233376 | A1 | * | 12/2003 | Bussler et al. ........... | 707/104.1 |
| 2005/0055306 | A1 | * | 3/2005 | Miller et al. ................... | 705/37 |

OTHER PUBLICATIONS

Chapter I, Introducing Oracle Designer, 2000, pp. 1-5, Oracle Corporation, www.inf.fu-berliln.de.
Oracle Designer/2000, Application Programmatic Interface, Sep. 1995, pp. 1-43.
Oracle Designer/2000, WebServer Generator, Version 2.1, Apr. 1998, pp. 1-30.
Oracle Designer 6i product Overview, Oct. 2000, pp. 1-13, Oracle Corporation, Redwood Shores, California.

(Continued)

Primary Examiner—Leslie Wong
(74) Attorney, Agent, or Firm—Gary R. Jarosik

(57) ABSTRACT

A system and method for accessing database design information stored in a database repository. To access the information, the system receives user input designating a workarea of the data repository as being of interest. Using the workarea designation, the system retrieves from the database repository a list of application systems associated with the workarea, a list of model details available for each application system, and a list of entities for each model detail. This retrieved information is displayed to the user using a tree-menu structure. Further design information can be accessed by the user designating an entity as being of interest. The system uses the entity designation to retrieve from the database repository design information for the designated entity which retrieved information is then displayed to the user.

19 Claims, 10 Drawing Sheets

OTHER PUBLICATIONS

Gopinath et al., Entity-Rlationship database Support for Real-Time Adaptions, IEEE, 1990, pp. 91-93.

Centeno et al., Databases: Designing and Developing integrated Simulations Mofeling, IEEE, Proceedings of the 1993 Winter Simulation Conference, pp. 526-534.

Tanawong et al., A fact-Based Object Oriented Database Design Tool with a Natural language Interface, IEEE, 2000, pp. II-266 to II-270.

Perkusich et al., Object-Oriented Real-Time Database Design Based on Petri Nets, IEEE, 1998, pp. 202-207.

Menniti et al., A Power System Java-Based Distributed Database Design, IEEE Electrical Power Engineering, 1999, PowerTech Budapest International COnference, p. 119.

Zhang et al., Role-based Databasse Designing for Managing Complex Ojbects and THeir Relationships on the Web, IEEE, 2000, pp. 212-219.

Lam et al., A Physical Database Design Evaluation System for CODASYSL Databases, IEEE, 1988, pp. 1010-1022.

* cited by examiner

Browser Heading. Note Project Selector.

Workarea Selector

Tabel Details. Note context-sensitive navigation menu.

| Column | Datatype | Nullable? | Description |
|---|---|---|---|
| AXRF ID | NUMBER (15) | NOT NULL | |
| CREDIT LIMIT TYPE | VARCHAR2 (2) | NOT NULL | The categorization of a type of change in which a maximum amount of money can be owed at any time that will disallow other purchases of that type of category from being made. |
| CREDIT LIMIT AMOUNT | NUMBER (15) | NOT NULL | The maximum money that can be outstanding for a particular category of charges. |
| UPD CNT | NUMBER(5) | NOT NULL | |
| CLASS ID | NUMBER(4) | NOT NULL | |
| LAST CHG DATETIME | DATE | NOT NULL | |
| LAST CHG OPER | VARCHAR2 (8) | NOT NULL | |

FIG. 9

Table Children Hierarchy. Each child receives a foreign key from the selected table.

NextGen 1.9.5 Rel/ACCOUNTXREF=Table Definition

Children of ACCOUNTXREF

Following are the tables that are dependent on ACCOUNTXREF. Changes to or deletes of ACCOUNTXREF keys require that the changes to be cascaded to the dependent tables.
Optional relationships are shown with a dashed line -----, and mandatory relationships are shown with a solid line ———.

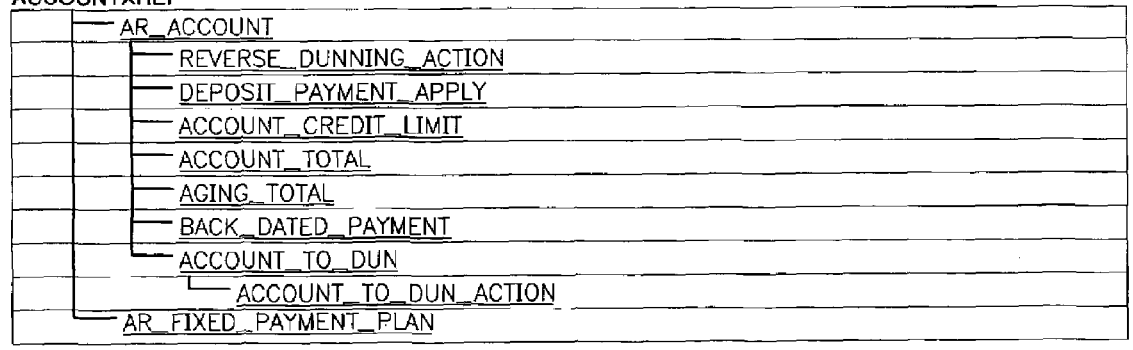

FIG. 10

Table Parent Hierarchy. The selected table inherits foreign keys from listed tables.

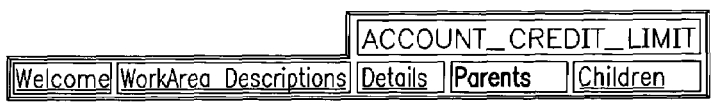

NextGen 1.9.5 Rel/ACCOUNT_CREDIT_LIMIT=Table Definition

Parents of ACCOUNT_CREDIT_LIMIT

Following are the tables upon which ACCOUNT_CREDIT_LIMIT is dependent. In order to populate ACCOUNT_CREDIT_LIMIT the proper foreign key values must be in place in its parent tables.
Optional relationships are shown with a dashed line -----, and mandatory relationships are shown with a solid line ———.

ACCOUNT_CREDIT_LIMIT

FIG. 11

SYSTEM AND METHOD FOR ACCESSING DATABASE DESIGN INFORMATION

RELATED APPLICATION INFORMATION

This application claims the benefit of and incorporates by reference the provisional application U.S. Ser. No. 60/284,503 filed on Apr. 18, 2001.

BACKGROUND OF THE INVENTION

This invention relates generally to computer database systems and, more particularly, to a system and method for accessing database design information.

In many organizations, there are numerous individuals that need access to database design information, for example, the information in an Oracle Designer Repository. In this regard, individuals such as application developers, testers, project managers and support technicians may access the Oracle Designer Repository to retrieve information for use in connection with data modeling, DDL generation, etc. Retrieving this information using presently known access tools is, however, expensive from the perspective of the cost of the software and the training needed to use these relatively complicated tools.

Furthermore, presently known information retrieval tools, such as Oracle Designer Web Assistant ("ODWA"), do not present information to individuals in a meaningful manner. In this regard, currently known interfaces tend to make it difficult for individuals to find information of interest since all information tends to be available for the individual to view. Thus, to the frustration of the individual, the individual must drill down through numerous screens to find information of specific interest. Unfortunately, the drill down requirement also causes individuals to become disoriented within the information presentation framework thus adding to this frustration.

SUMMARY OF THE INVENTION

To provide individuals with a more user-friendly tool by which database design information may be accessed, the subject invention generally provides a browser-based system and method for accessing database design information. Generally, to access the information, the system receives user input designating a workarea of the data repository as being of interest. Using the workarea designation, the system retrieves from the database repository a list of application systems associated with the workarea, a list of model details available for each application system, and a list of entities for each model detail. This retrieved information is displayed to the user using a tree-menu structure. Further design information can be accessed by the user designating an entity as being of interest. The system uses the entity designation to retrieve from the database repository design information for the designated entity which retrieved information is then displayed to the user. Meanwhile, the tree-menu remains accessible to the user. In this manner, a system and method is provided that allows a wide range of users, such as executive management to production support personnel, to simply access information they need to perform their respective jobs.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to preferred embodiments shown in the attached drawings in which:

FIGS. 9–11 are screen shots illustrating exemplary views of database design information.

DETAILED DESCRIPTION

Figure 1:
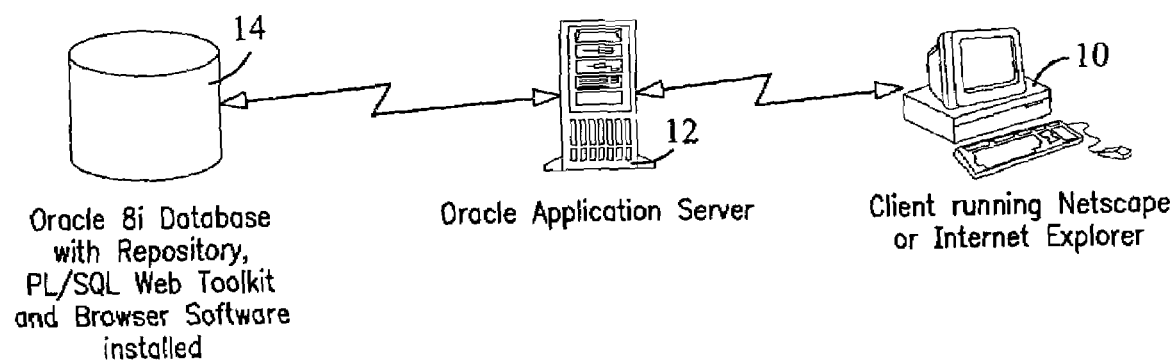
FIG. 1 is a block diagram illustrating an exemplary network in which the principles of the subject invention may be employed.
Figure 2:
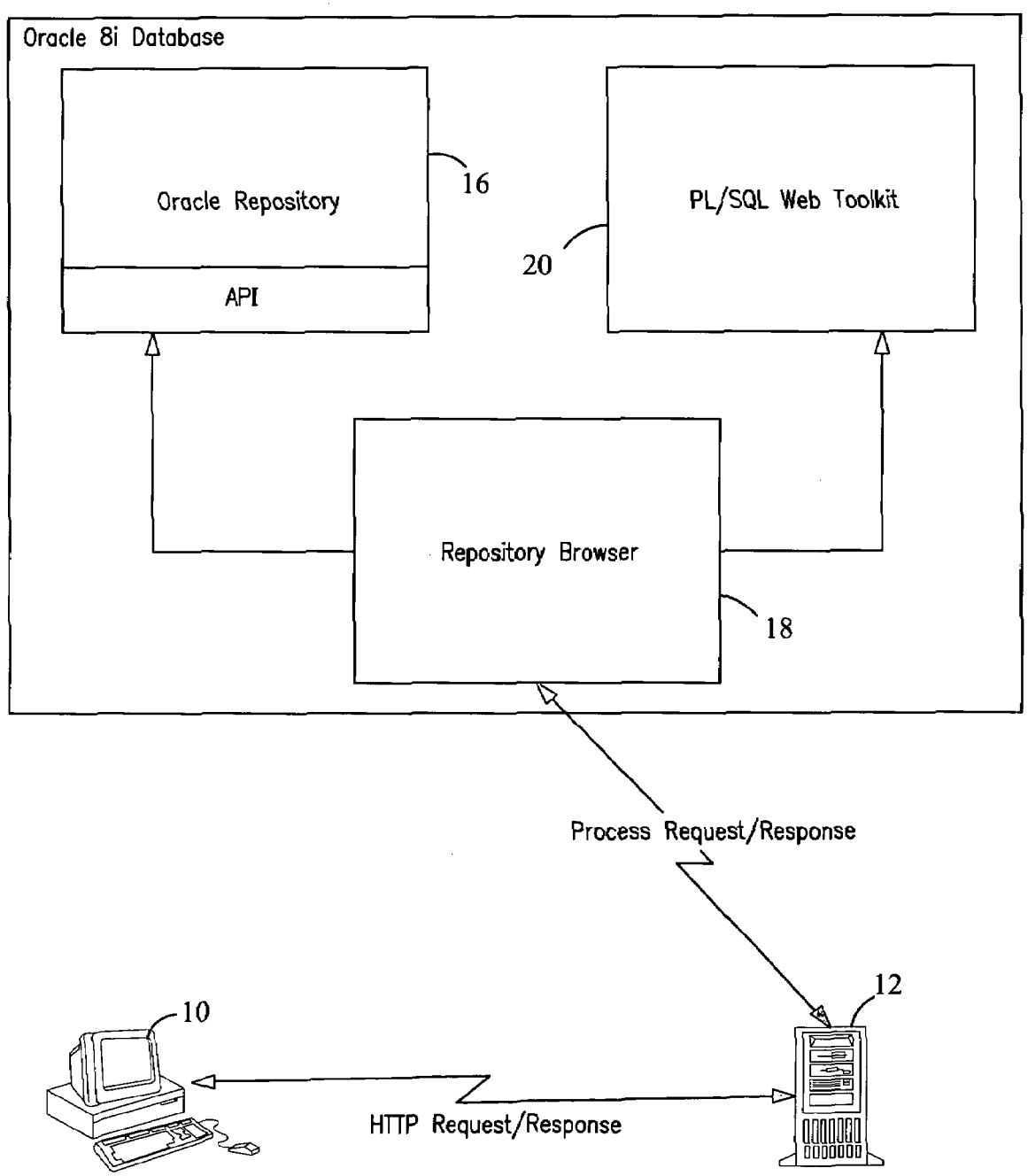
FIG. 2 is a block diagram illustrating the network of FIG. 1 and further detailing various software components used to provide access to database design information.

Turning now to the figures, wherein like reference numerals refer to like elements, there is illustrated in FIGS. 1 and 2 an exemplary network by which database design information may be accessed and presented to the user in a meaningful manner. Generally, in the illustrated embodiment, the network includes a client 10 and a server 12 having an associated database 14. The client 10 preferably hosts a Web-browser, for example, the Netscape or Internet Explorer brand Web-browsers, that provides access to a database repository browser application 18. The database browser application 18, hosted on the server 12, is, in turn, used to communicate with the database, for example, an Oracle brand database that comprises a database repository 16 and a PL/SQL Web Toolkit 20. While the subject invention will be described in the context of such an Oracle brand database, this description is not intended to be limiting. Rather, those of ordinary skill in the art will readily appreciate that the principles of invention described hereinafter may be used in connection with other database applications without departing from the scope of the invention as set forth in the claims that follow.

Within the illustrated network, the client 10 and server 12 can be implemented on one or more general purpose computing devices which operate under the control of computer executable instructions. Those of skill in the art will appreciate that the general purpose computing devices need not be limited to computers and servers but may include hand-held devices, multiprocessor systems, microprocessor-based or programmable consumer electronics, minicomputers, mainframe computers, and the like. Furthermore, the computer executable instructions may include routines, programs, objects, components, and/or data structures that perform particular tasks. Within the network, the computer executable instructions may reside on a single general purpose computing device or the tasks performed by the computer executable instructions may be distributed among a plurality of the general purpose computing devices.

For performing the tasks in accordance with the computer executable instructions, the general purpose computing devices preferably include one or more of a video adapter, a processing unit, a system memory, and a system bus that couples the video adapter and the system memory to the processing unit. The video adapter allows the computing devices to support a display, such as a cathode ray tube ("CRT"), a liquid crystal display ("LCD"), a flat screen monitor, a touch screen monitor or similar means for displaying textual and graphical data to a user. The display allows a user to access, view, enter, and/or edit information that is relevant to the operation of the network. User input to the general purpose computing devices may be achieved by means of a keyboard, mouse, joystick, or the like.

The system memory in the general purpose computing devices may include read only memory ("ROM") and/or random access memory ("RAM"). The general purpose computing devices may also include a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices.

To connect the general purpose computing devices within the network, in the case where more than the one general purpose computing device is utilized, the general purpose computing devices may include a network interface or adapter. When used in a wide area network, such as the Internet, the general purpose computing devices typically include a modem or similar device which functions in the same manner as the network interface. The modem, which may be internal or external, may be connected to the system bus via an external port interface. It will be appreciated that the described network connections are exemplary and that other means of establishing a communications link between the general computing devices may be used. For example, a wireless access interface that receives and processes information from the general purpose computing devices via a wireless communications medium, such as, cellular communication technology, satellite communication technology, blue tooth technology, WAP technology, or similar means of wireless communication can be utilized.

To provide network security, the network may also utilize security techniques that have become customary when conducting electronic communications. These security techniques include, but are not limited to, firewalls, encryption, authentication certificates, directory-based user registration and security management, etc. Because the capabilities and best practices of network communication security are constantly evolving and improving, this document does not espouse the use of any particular technique, technology or product. Rather, it simply specifies that the network architecture may support the use of security practices necessary to protect the business interests of the participants and to insure the overall integrity and confidentiality of information within the system.

For exchanging information between the platforms within the network any protocol can be utilized. For example, it is contemplated that communications can be performed using TCP/IP. Generally, HTTP and HTTPS are utilized on top of TCP/IP as the message transport envelope. Additional protocol technologies such as FTP, SSL, etc. may also be utilized. Furthermore, depending on the differing business and technical requirements of the various components within the system, the physical network may embrace and utilize multiple communication protocol technologies.

Access to the network and, in particular, the database browser application 18 is provided by the Web browser hosted on the client 10. In this regard, the Web browser hosted on the client 10 is also used as the application to display information retrieved from the database repository via the database browser application 18. Thus, it will be appreciated that the database browser application generally communicates markup language pages, Java applets, etc. to the Web browser hosted on the client 10 by which the user can view any retrieved database design information and/or issue requests for the performance of additional actions by the database browser application 18.

Figure 4:
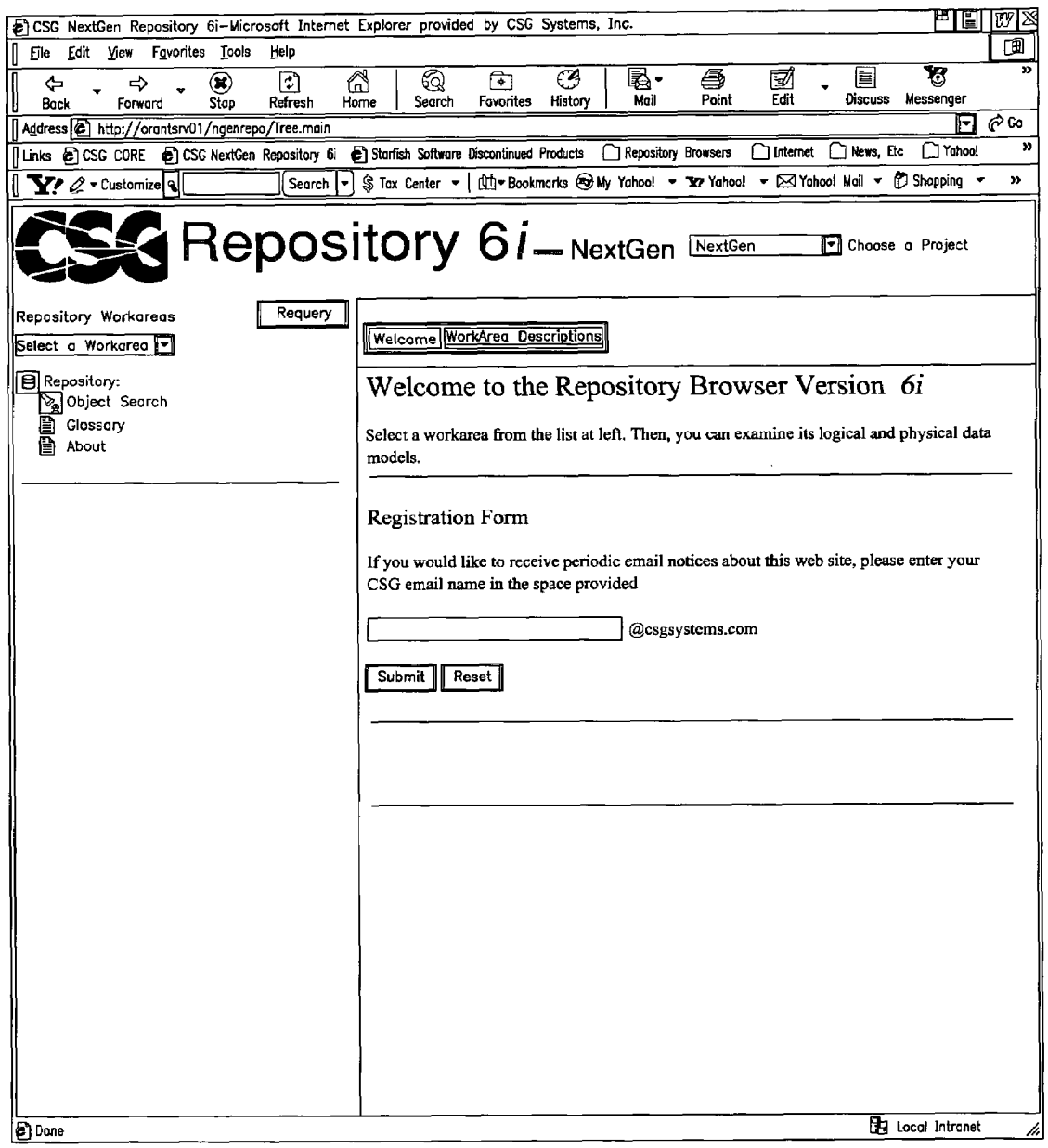
FIG. 4 is screen shot illustrating an exemplary welcome page.

More specifically, to provide access to the database design information, the user may first be presented with a welcome page that is displayed within the Web browser of the client 10, an example of which is illustrated in FIG. 4. Among other things, the welcome page provides a registration form by which an individual can indicate a desire to be informed, via email for example, of upgrades, modifications, etc. concerning the system. The welcome page also provides a means by which a user can select a particular set of information from all of the design information maintained in the database repository(s) that the user is specifically interested in. This ability to initially reduce the amount of information to which the user is exposed (or has access to) during a given user session is seen to advantageously minimize the chance that a user gets lost in the presentation of extraneous information which typically leads to user frustration.

Figure 5:
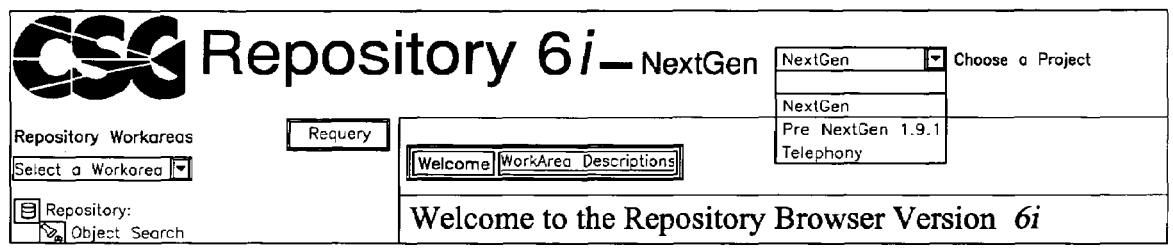
FIG. 5 is a screen shot illustrating an exemplary menu for selecting a project.

For use in designating a subset of the design information in the database as being of particular interest to a user, the user may by be provided with a listing of available database repositories from which the user may select a repository of interest. Generally, each repository may be represented by a unique URL or by user-defined project names (when located in different logical repositories as opposed to physical repositories). In the example illustrated in FIG. 5, the available database repositories are set forth in a menu wherein each database repository is provided with a project name, such as the "NextGen, "Pre NextGen 1.9.1," and "Telephony" projects. After one of the listed repositories has been selected by the user (using conventional GUI techniques), the database browser application 18 functions to query the database repository to obtain further high-level information concerning the user-selected repository, namely, the workareas within the designated repository.

Figure 6:
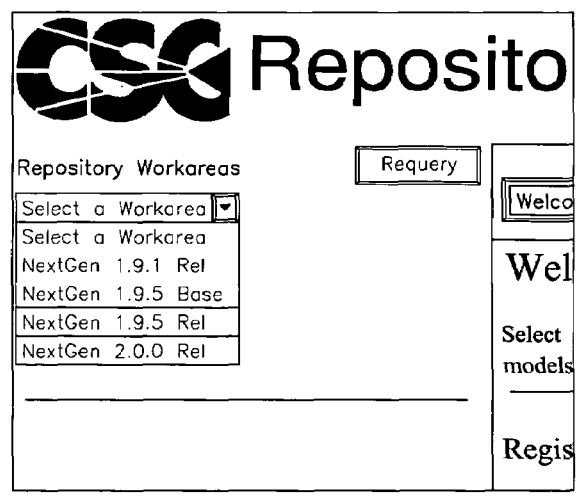
FIG. 6 is a screen shot illustrating an exemplary menu for selecting a workarea.
Figure 7:
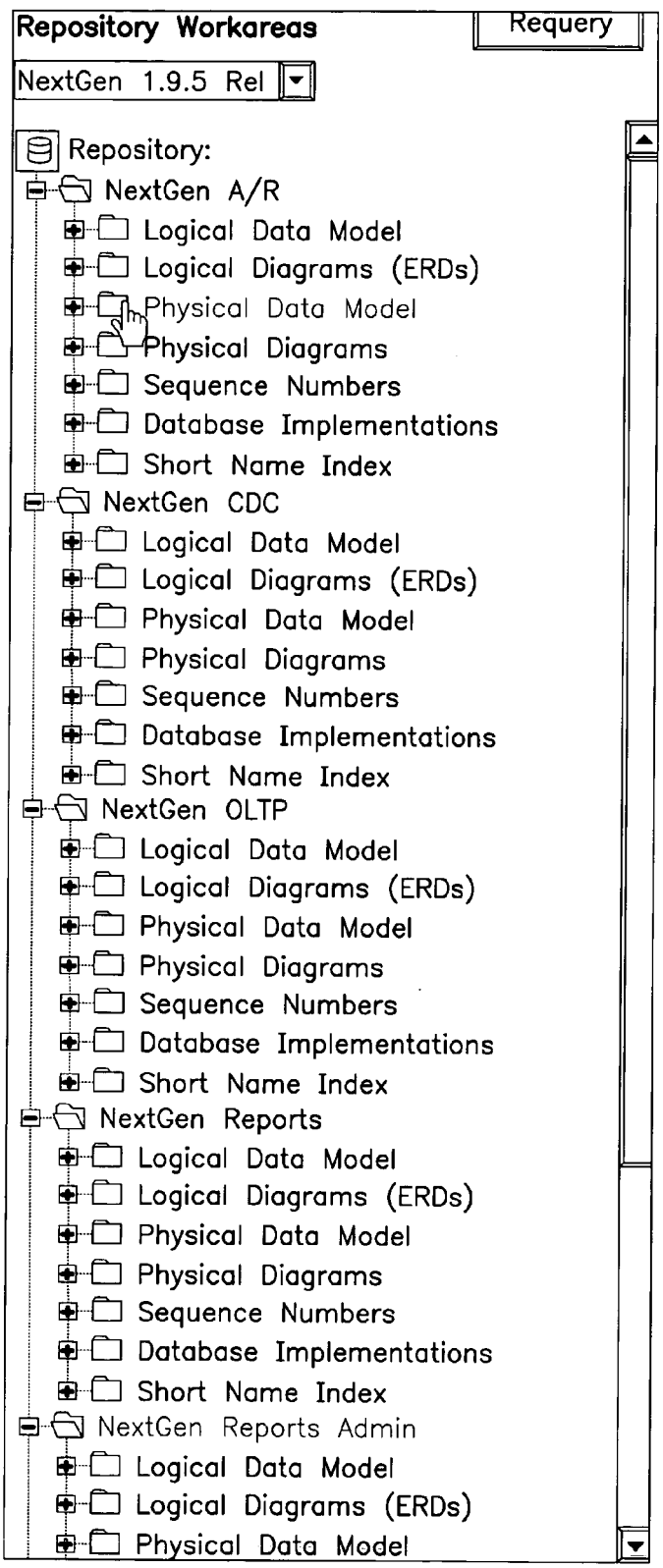
FIG. 7 is a screen shot illustrating an exemplary application system tree-menu.
Figure 8:
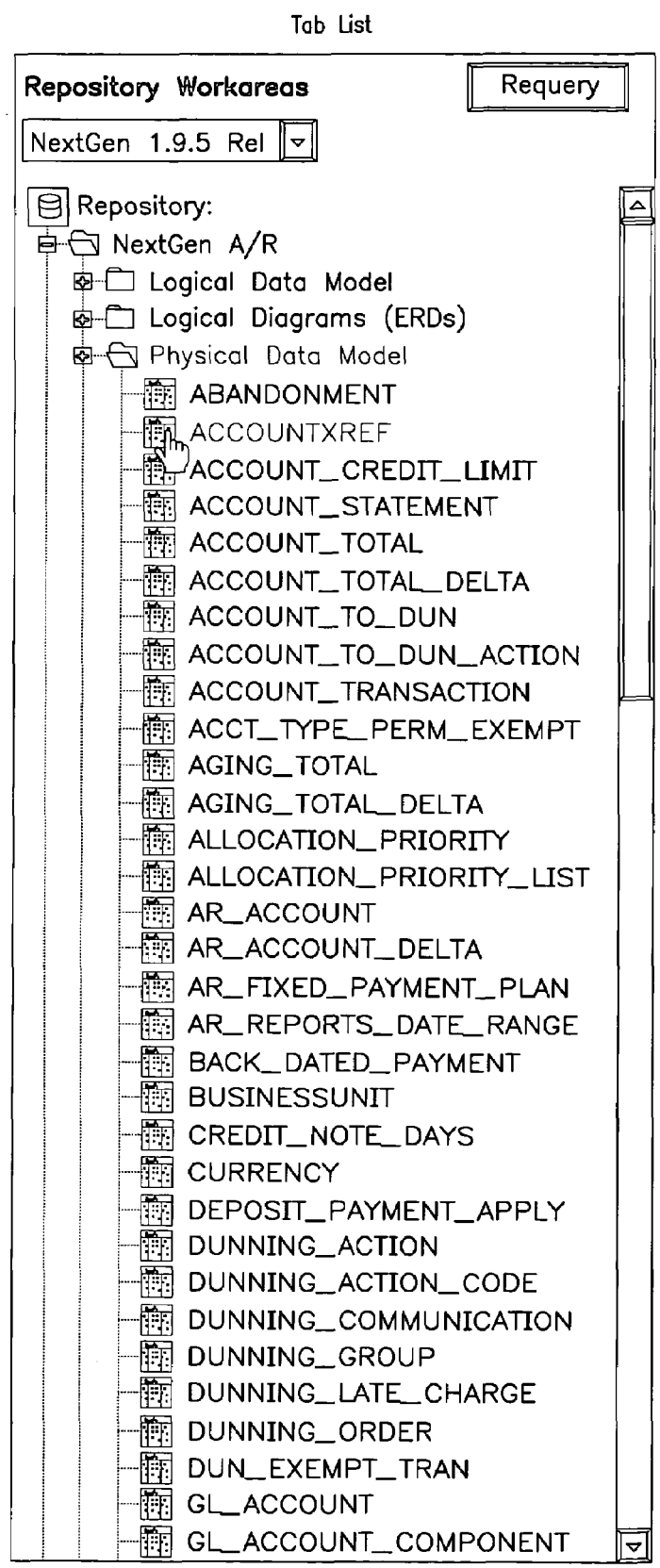
FIG. 8 is a screen shot illustrating the exemplary application system tree-menu of FIG. 7 further exploded.

This workarea information retrieved from the designated repository is then formatted by the database repository browser application 18 and returned to the Web browser on the client 10 for presentation to the user. Again, this information can be placed in a menu listing from which the user can select a workarea of interest. An exemplary workarea listing for the user-selected "NextGen" repository is illustrated in FIG. 6. When the user selects a workarea of interest, for example, the "NextGen 1.9.5 Rel" workarea, as illustrated in FIG. 6, the database repository browser application 18 is again notified of the selection and functions to retrieve from the database repository 16 a listing of the application systems within the designated workarea. As before, the repository browser application 18 formats this additionally retrieved information and returns it to the Web browser on the client 10 for presentation to the user. As illustrated in FIG. 7, information, such as model details available (see FIG. 7) and entities for the model details (see FIG. 8), related to a selected workarea is preferably presented to the user using a tree-menu structure. The user may then select items from this tree-menu structure to obtain detailed design information from the database repository. As will be appreciated, the use of a tree-menu structure has the advantage of providing a visual indication to the user of their location within the search context as they seek information of interest. It will be appreciated that access to information, such as workareas and application systems, can be controlled through permission grants so that as many or as few of each may be displayed to a user.

Figure 3:
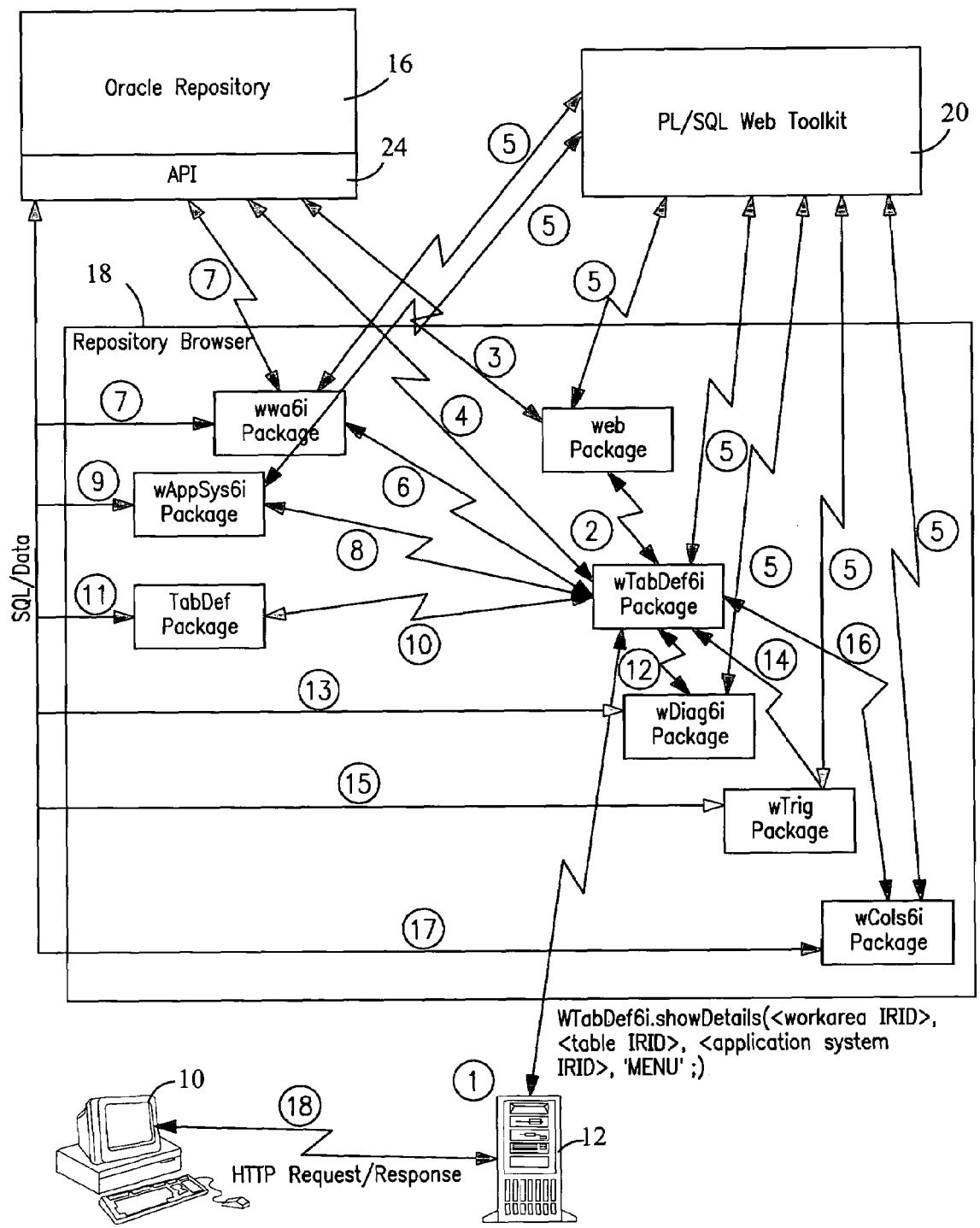
FIG. 3 is a block diagram illustrating the network of FIGS. 1 and 2 with still further details regarding the various software components used to provide access to database design information.

To respond to requests from the client 10, retrieve highlevel and detailed design information from the database repository 16, and format any retrieved information for display to the user in the Web browser on the client 10, the repository browser 18 generally includes software modules adapted to cooperate with the APIs 24 of the database repository 16 and the PL/SQL Web toolkit 20 associated with the database. In this regard, the APIs of the Oracle brand database repository are published and in the public domain. The general operation of the software modules can be illustrated by way of the following example in which detailed design information concerning a data model that is listed in the tree-menu of a specific workarea (e.g., see FIG. 8) is retrieved from the Oracle 6*i* database repository for presentation to the user. To this end the following steps may be performed with reference to FIG. 3:

(1) Selection of a GUI item (e.g., "ACCOUNT_CREDIT_LIMIT" of FIG. 8) passes a URL from the client 10 to the server 12. The application server 12 recognized the URL as a call to the PL/SQL agent and invokes the WTabDef6i module procedure:

WTabDef6i.showDetails (<workarea IRID>, <table IRID>, <application system IRID>,'MENU';).

It is noted that the parameters in <angle brackets> are values to be supplied. Typically, but not always, these are long integers (e.g., which are used by Oracle as identifiers—the IRIDs). Sometimes, they are text strings. In this example names have been used that would be meaningful as the <parameters>.

(2) The showDetails procedure of the WTabDef6i module makes several calls to the web package to set the context workarea, to display application-standard headers, and to generate JavaScript code. These may include:

web.waContextChecking (<workarea IRID>);
web.headTitle ('Details for'<table_name>);
web.detJS ('wTabDef6i');
web.getDef (<table IRID>).

(3) Invoked in step (2), web.waContextChecking is a wrapper procedure for the Repository API procedure:

jr_context.set_workarea (<workarea IRID>);

(4) The table name is retrieved from the Repository API using:

jr_name.get_CRN_from_IRID (<table IRID>);

(5) Numerous calls are placed to the PL/SQL Web Toolkit 20 to produce the requested HTML. Most of these are calls to the HTP and/or HTF packages, but there are also calls to OWA_UTIL and OWA_Cookie.

(6) A call is made to wwa6I package to get a formatted path for the workarea/application system/table.

Wwa6i.fmtWAFolderPath (<workarea IRID>, <table IRID>);

(7) Wwa6i.fmtWAFolderPath assembles the full path by querying the repository view SDD_Workareas to get the workarea name, and using the API call jr_name.get_path (<table IRID>, 'NAMETYPE') to get the object path. This information is combined and returned to wTabDef6i.showDetails.

(8) A call is made to wAppSys6I to list any additional application systems that may contain the table.

WAppSys6i.listAppSys (<table IRID>, <application system IRID>);

(9) WappSys6i.listAppsys queries to see if there are any application systems besides the given that contain the given table. If there are, they are listed. Either way, control is returned to wTabDef6i.showDetails.

(10) Information about the table is obtained through calls to the tabDef package. These calls include:

TabDef.hasUK (<table IRID>);—returns TRUE if the table has a unique key.
TabDef.isRefd (<table IRID>);—returns TRUE if the table is referenced by other tables.
TabDef.hasCheckCons (<table IRID>);—returns TRUE if the table has check constraints defined.
TabDef.hasIndexes (<table IRID>);—returns TRUE if the table has indexes defined.
Tabdef.hasTrig (<table IRID>);—returns TRUE if the table has triggers defined.
TabDef.tabEntExists (<table IRID>);—returns TRUE if the table has a mapping to one or more entities.
TabDef.hasDBI (<table RID>);—returns TRUE if the table is defined to be implemented in one or more databases.

Calls are also made to exposed cursors in the tabDef package:

TabDef.getCons (<table IRID>, <constraint type>):—Returns information about constraints of the specified type.
TabDef.getFKs (<table IRID>);—Returns information on all foreign keys for the table.
TabDef.getKeyComp (<foreign key IRID>);—Returns information about the columns that comprise the foreign key.
TabDef.getcol (<table IRID>);—Returns information about all columns belonging to the table.
TabDef.getRefs (<table IRID>);—Returns a list of tables that reference the indicated table.
TabDef.getInd (<table IRID>);—Returns information about all indexes for the table.
TabDef.getIndCol (<index IRID>);—Returns information about the columns for the index.
TabDef.getEntMap (<table IRID>);—Returns a list of entities that are mapped to the table.
TabDef.getDBI (<table IRID>);—Returns a list of database definitions that include the table.

(11) The tabDef package places calls to the Oracle Repository API to retrieve information requested in step 6, above.

(12) A call is made to wDiag6I to see if there are any diagrams that contain the table. If there are, they are listed.

WDiag6i.inDiag (<table IRID>, 'DSD');—returns TRUE if the table is represented in one or more DSD diagrams.
Wdiag6i.listDiags (<workarea IRID>, <table IRID>, 'DSD');—Each diagram that contains the table is listed. If the diagram has been published to the browser via a PDF file, the diagram is represented as link.

(13) WDiag6I queries the repository to retrieve the requested information.

(14) If tabDef.hasTrig returns TRUE, then a call is made to wTrig to list the triggers as links to open the source code for each trigger in a separate window.

WTrig.listTrigs (<table IRID>);

(15) Wtrig queries the repository to retrieve the requested information.

(16) A call is made to wCols6I to list the detailed information for each column.

WCols6i.addDetails (<table IRID>, 'MENU');

(17) Wcols6I queries the repository to retrieve the requested information.

(18) The formatted page is returned to the client and presented to the user in the Web browser on the client 10 (e.g., the details for the table definition of "ACCOUNT_CREDIT_LIMIT" as illustrated in FIG. 9).

To create the tree-menu structures to be displayed by the Web browser on the client 10, the browser application may use a JavaScript such as the fully functional, public domain JavaScript tree menu found at treemenu.com. In this regard, while this public domain JavaScript is a very flexible multi-frame menuing program, it was still modified for use in building the tree-menus for the subject application. To this end, since the top-level menu items ("Object Search," "Glossary" and "About") are the same regardless of the repository information being selected, these top-level menu items may be hardcoded using the HTP.PRINT procedure to write out the JavaScript. In this case, "Object Search" can be selected to invoke a search procedure for use in finding all repository objects that match a submitted criteria, "Glossary" can be selected to present a definition of repository terms, and "About" can be selected to access versioning information, etc. regarding the repository browser application. For each menu item that is variable, i.e., it depends on the repository being accessed, the cursor loop is used to query the repository for the specific object type (e.g., by using an id or name), entities or table definitions (e.g., by using a short name).

To further assist in the user-friendly navigation of the information in the repository, the tree-menu structure allows that user to view information pertaining to logical models and logical diagrams (ERDs) as well as the physical data models for the designated workarea. A logical model page may display database design information such as owning application system information, entity name, short name, plural name, primary key components, any additional keys and their components, attribute details including name (which link to their definitions), datatype, maximum length and optionality, relationships with links to related entities, entity definition, links to display entity diagrams, table implementations, and/or attribute definitions. A physical model page, an example of which is illustrated in FIG. 9, may display database design information such as owning application system information, table name, primary key component, any additional unique keys and their components, column details including name (which link to their definitions), datatype, maximum length and nullable indicator, table definition, foreign keys with links to related tables, foreign key usage with links to related tables, check constraints, indexes and components, links to diagrams, triggers with links to the trigger text, entities implemented, and/or column definitions. As will be appreciated, the retrieval and formatting of this information for presentation to the user in the Web browser on client 10 would generally be performed in a manner similar to that described previously.

A diagram information page may be used to list the contents of a selected diagram (e.g., the entity-relationship or sever model) with links to the objects. A further feature allows the diagram to be displayed from a link as well (as noted above). In this regard, when an Oracle database is being used, Oracle has not provided a way to read diagram graphic information through an API. Therefore, to allow the server to know that a diagram is there and available to display, a UTL_HTTP package may be employed. Using a UTL_HTTP.REQUEST, if a URL does not exist, the OAS returns a file not found page. When a file not found page is returned, the diagram may be indicated as being present by name, but no link would be provided to access the file. However, if the URL does exist, the name may be displayed as a link by which access to the diagram may be gained. Preferably, graphics files are stored as .PDF files using the full version of Adobe Acrobat.

Still further, the system allows for the viewing of children and parent hierarchies for entities and tables, examples of which are illustrated in FIGS. 10 and 11, respectively. These pages show all of the objects that either contribute to or receive a foreign key from the selected object. To collect the hierarchy information, which is subsequently formatted for display as a Web page in the Web browser on the client 10, a procedure is used that builds up an index-by table of records. To this end, a parameter is passed to the procedure that tells it to look up (for parents) or down (for children) and the procedure is called recursively until the table holds all of the parents or children for the object.

Once the table is populated, there is a loop to format the results for display. For this purpose, a tree-graphic may be made having four separate small graphics, each identified by a single letter (e.g., B for blank, S for straight or vertical, L for end of branch, and T for mid branch). For each row in the table, a sequence is determined in which the graphics will be displayed. This sequence is represented by the string of the four graphics characters. Each letter in the string is then examined and the correct graphics followed by a link to the parent or child object is printed. These links may be used to open further display windows (e.g., to display the SHOW-DETAILS for the selected object.)

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof. All of the references cited herein are hereby incorporated by reference in their entirety.

What is claimed is:

1. A method for accessing database design information stored in a database repository, comprising:

receiving user input designating a workarea as being of interest;

using the workarea designation to retrieve from the database repository a list of application systems associated with the workarea, a list of model details available for each retrieved application system, and a list of entities for each retrieved model detail;

displaying in a tree-menu structure the list of retrieved application systems, the list of retrieved model details, and the list of retrieved entities wherein the retrieved entities are displayed under their corresponding retrieved model details and the retrieved model details are displayed under their corresponding retrieved application systems;

accepting input from the user designating an entity as being of interest;

using the entity designation to retrieve from the database repository design information for the designated entity; and displaying the design information to the user.

2. The method as recited in claim 1, wherein the list of model details comprise logical model details.

3. The method as recited in claim 1, wherein the list of model details comprises physical model details.

4. The method as recited in claim 1, further comprising retrieving hierarchical information from the database repository regarding the designated entity and displaying the hierarchical information to the user.

5. The method as recited in claim 1, further comprising displaying to the user a link to a design figure in which the designated entity appears.

6. The method as recited in claim 1, wherein user input is received through a Web browser application.

7. The method as recited in claim 1, wherein the database repository comprises an Oracle database repository.

8. A computer-readable media having instructions for accessing database design information stored in a database repository, the computer-readable media performing steps comprising:

receiving user input designating a workarea as being of interest;

using the workarea designation to retrieve from the database repository a list of application systems associated with the workarea, a list of model details available for each retrieved application system, and a list of entities for each retrieved model detail;

displaying in a tree-menu structure the list of retrieved application systems, the list of retrieved model details, and the list of retrieved entities wherein the retrieved entities are displayed under their corresponding retrieved model details and the retrieved model details are displayed under their corresponding retrieved application systems;

accepting input from the user designating an entity as being of interest; using the entity designation to retrieve from the database repository design information for the designated entity; and displaying the design information to the user.

9. The readable-media as recited in claim 8, wherein the list of model details comprise logical model details.

10. The readable-media as recited in claim 8, wherein the list of model details comprise physical model details.

11. The readable-media as recited in claim 8, wherein the instructions further perform the steps of retrieving hierarchical information from the database repository regarding the designated entity and displaying the hierarchical information to the user.

12. The readable-media as recited in claim 8, wherein the instructions further perform the step of displaying to the user a link to a design figure in which the designated entity appears.

13. The readable-media as recited in claim 8, wherein the database repository comprises an Oracle database repository.

14. A method for accessing database design information stored in a database repository, comprising:

receiving user input designating a repository as being of interest;

using the respository designation to display to the user a list of workareas within the repository;

receiving user input designating a workarea as being of interest;

using the workarea designation to retrieve from the database repository a list of application systems associated with the workarea, a list of model details available for each retireved application system, and a list of entities for each retrieved model detail;

displaying in a tree-menu structure the list of retrieved application systems, the list of retrieved model details, and the list of retrieved entities wherein the retrieved entities are displayed under their corresponding retrieved model details and the retrieved model details are displayed under their corresponding retrieved application systems;

accepting input from the user designating an entity as being of interest;

using the entity designation to retrieve from the database repository design information for the designated entity; and displaying the design information to the user.

15. The method as recited in claim 14, further comprising using permission grants to determine workareas to display in the list of workareas.

16. The method as recited in claim 15, further comprising using permission grants to determine application systems to display in the list of application systems.

17. The method as recited in claim 1, comprising displaying mandatory relationships within the tree-menu structure in a manner different from a manner in which optional relationships within the tree-menu structure are displayed.

18. The method as recited in claim 17, wherein mandatory relationships are displayed utilizing solid lines while optional relationships are displayed utilizing non-solid lines.

19. The method as recited in claim 1, comprising allowing a user to display a children or parent hierarchy for a designated entity.

* * * * *